United States Patent [19]

Mast

[11] 4,250,925

[45] Feb. 17, 1981

[54] PIPE UNFREEZER

[76] Inventor: Kenrick H. Mast, 25333 Alpine La., Bend, Oreg. 97701

[21] Appl. No.: 57,207

[22] Filed: Jul. 13, 1979

[51] Int. Cl.³ .................... F16L 55/00; E03B 7/14; B08B 9/02
[52] U.S. Cl. .................................. 138/35; 138/109; 15/104.3 SN; 134/167 C; 134/198; 239/602
[58] Field of Search .................. 138/34, 35, 109; 134/22 C, 24, 166 C–169 C, 172, 198; 239/589, 602; 15/104.3 SN

[56] References Cited

U.S. PATENT DOCUMENTS

| | | | |
|---|---|---|---|
| 501,744 | 7/1893 | Streeper | 138/35 |
| 558,992 | 4/1896 | Silver | 138/35 |
| 1,900,275 | 3/1933 | Carter et al. | 15/104.3 SN |
| 3,195,548 | 7/1965 | Lestakis | 134/167 C |
| 3,345,995 | 10/1967 | Pfaffenberger et al. | 134/24 X |
| 3,959,840 | 6/1976 | Sato | 15/104.3 SN |
| 4,050,384 | 9/1977 | Chapman | 134/166 C X |
| 4,124,039 | 11/1978 | St. Laurent | 138/35 |

Primary Examiner—Robert L. Bleutge
Attorney, Agent, or Firm—Kolisch, Hartwell & Dickinson

[57] ABSTRACT

Apparatus for unthawing frozen water pipe including a feed tube which is advanced into the frozen pipe having a probing end formed by pliant fingers forming a tip for the feed tube. The feed tube is directed into the pipe by a tube channeling length of hose means through which the feed tube passes loosely. A static pressure of water prevents leakage of water from the tube channeling length of hose means.

8 Claims, 3 Drawing Figures

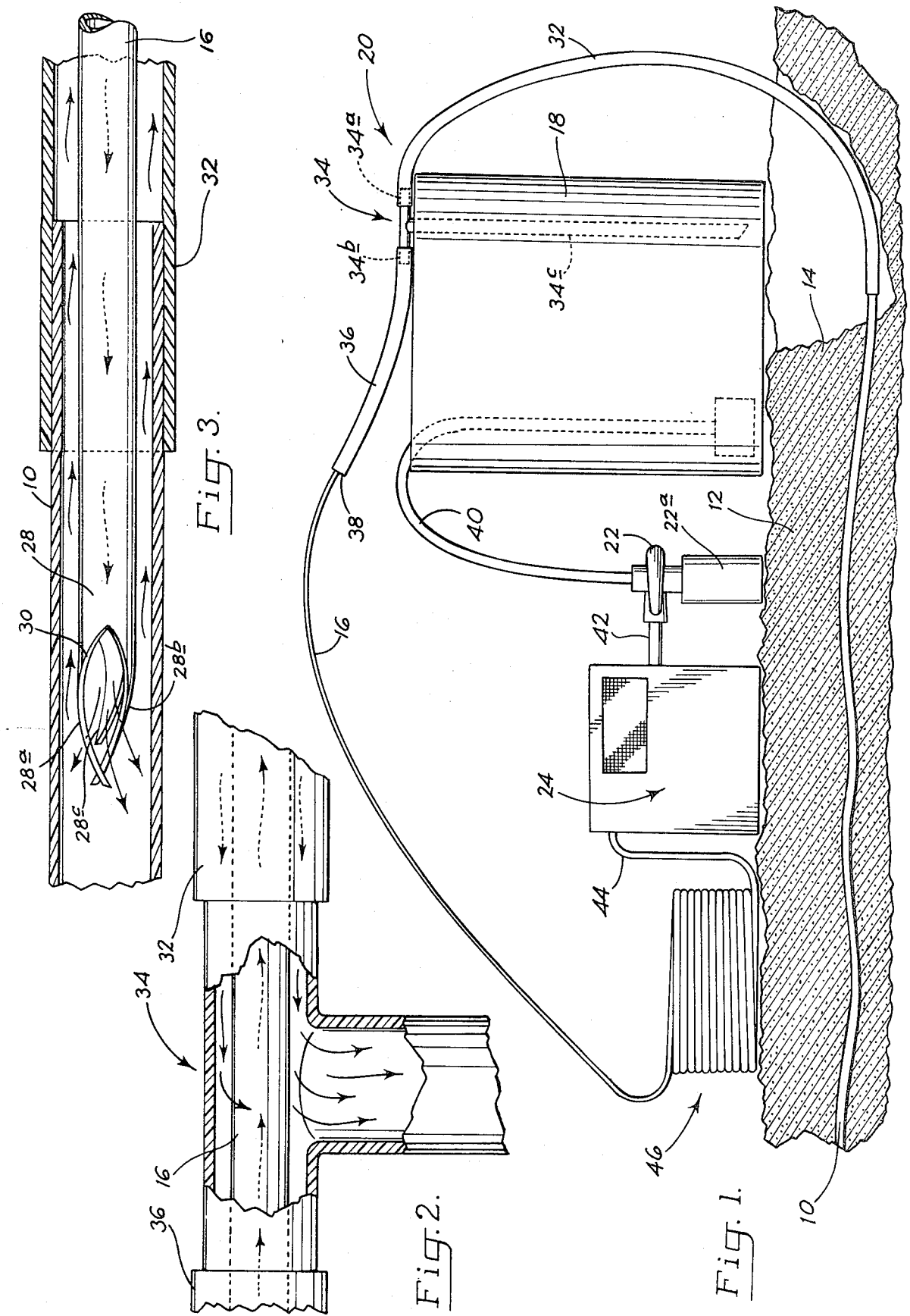

PIPE UNFREEZER

This invention relates to apparatus for thawing frozen water pipe and more particularly to such apparatus which utilizes water circulated into the pipe which melts and flushes out the ice within the pipe.

In the past, it was common to utilize steel pipe in the conduit system relied upon to deliver water to a building and for directing such water to various points throughout the building. In recent years, such steel pipe has been replaced by copper tubing, and to an increasingly greater extent by plastic pipe, such as so-called PVC pipe and polyethylene pipe. While the plastic pipe has performed well, it does introduce problems in connection with thawing a frozen pipe, since applying heat as with a torch destroys the pipe.

Systems which employ water circulate through a pipe which melts and flushes out ice in the pipe have been proposed. Generally, however, such apparatus has been characterized by a construction that makes it difficult to reach any great distance into the pipe, which means that with an underground pipe extending any length, appreciable excavation must be performed to expose the pipe at locations spaced closed together, which has obvious drawbacks.

A general object of this invention is to provide improved apparatus for thawing frozen water pipe which includes what is referred to herein as a so-called feed tube and a tip at the distal or probe end of the tube so constructed and organized that the tube is advancable as much as 100 feet or more along the interior of a frozen pipe.

A related object is to provide such apparatus constructed in such a manner as to minimize the resistance offered to the feed tube as such is advanced along a pipe. This operates to increase the effective distance that the feed tube can be advanced within a pipe. The tube itself is provided with a tip at the probing end thereof which maximizes the ability of the tube to move around curves and pass over joints which may be in the pipe.

Yet another object is to provide frozen pipe thawing apparatus which is reliable in operation, and which can be used in the unthawing of pipe without risk of the apparatus hanging up in the pipe so as to prevent retraction after thawing has been performed.

These and other objects and advantages are attained by the invention, which is described hereinbelow in conjunction with the accompanying drawings, wherein:

FIG. 1 illustrates apparatus as contemplated, with such connected to an underground pipe;

FIG. 2 is an enlarged view of portions of a "T" member in the apparatus; and

FIG. 3 is an enlarged view showing the probe end of a feed tube in the apparatus moving along the interior of a pipe.

Referring now to the drawings, illustrated in FIG. 1 is a typical water pipe installation wherein the apparatus of the invention might be utilized. Thus, there is shown an underground water pipe 10 which is embedded in ground 12. If the pipe is typical of present day installations, it may be a so-called PVC pipe. As is typical with such pipe, the pipe does not lie in an exactly straight line under the ground, but extends in a slight spiral, by reason of the pipe having come before installation from a winding and such imparting a slight bend which is never completely lost. Furthermore, along the length of pipe there may be couplings and other fittings interrupting the continuity of the pipe and introducing the possibility that anything advanced through the pipe will hang up and have either its advancement or retraction impaired. If the water within the pipe has become frozen, an excavation is made as at 14, and the pipe cut off, to provide access to the pipe interior.

The apparatus of the invention includes what is referred to herein as an elongate feed tube 16, a reservoir or receptacle 18 for holding the water to be circulated, a water return hose system 20, a pump 22 for circulating the water, preferably a heater 24 whereby the water circulated is warmed, and conduit structure connecting the reservoir pump and heater whereby the water may be drawn off from the reservoir and introduced to the heater whence it may be circulated through the feed tube 16.

Considering specifically the feed tube 16, such has a length sufficient to enable it to be advanced a considerable distance into the frozen pipe and typically the apparatus might include 200 feet or more of such tube. The tube is made of stiff but slightly pliant plastic material such as polybutyl or polyethylene plastic. Generally describing the pliancy of the tubing, in tubes that have been used, the tube is sufficiently pliable so that a six inch length of tube may be readily bent manually over a 90° turn or curve. The tubing however is not so pliable as to unduly bend on itself, as this would result on the tube upon being forced through a pipe tending to become overly convoluted, which has the effect of increasing the friction between the tube and the pipe through which the tube is being advanced. I have found that preferably the tubing that is used should be of such stiffness that a six foot expanse of tube, when supported at one end only and when positioned to extend out from the support in a horizontal direction, will deflect through the weight of the tube no more than about 30°.

It is preferable also that the tube slide easily through the pipe being unthawed, which is achieved by having the outer cross-sectional area taken up by the tube being substantially less than the cross-sectional area of the pipe interior which the tube is to be advanced through. Thus, in the unthawing of a one inch pipe, which typically has a wall thickness of less than a ⅛-inch, a feed tube having an outside diameter of ½-inch has been found to perform adequately. With ¾-inch pipe, having a slightly smaller wall thickness, a feed tube of ⅜-inch outer diameter is preferred. With larger pipe, larger tubing may be conveniently used. Generally speaking, the cross-sectional area of the interior of the pipe should be at least about one and a half times the outer cross-sectional area of the tubing employed. With this condition, an adequate passage exits about the outside of the tube for the flow of melted ice and water which is expelled from the pipe. The tube also moves freely through the pipe without excessive frictional resistance resulting between the outside of the tube and the interior of the pipe.

Feed tube 16 has a distal or probing end which leads the tube down the pipe as the tube is advanced thereinto. In FIG. 3, this probing end of the tube is shown at 28. At tip is provided at this probing end which is constructed in such a manner as to provide for the discharge of water from the feed tube laterally and in a forward direction from the tip and which is also constructed to guide the end of the tube whereby such moves over curves and across obstructions without hanging up within the pipe. The construction is also one which will not impair retraction of the tube from the pipe when the unthawing job is completed by reaction of catching on an obstruction in the pipe.

Specifically, the tip takes the form of elongate side expanses shown at 28a, 28b and 28c that converge of each other progressing toward the end of the tip. Openings are defined between the side expanses as illustrated by opening 30 between expanses 28a, 28b. The side expanses may be conveniently formed by cutting the sides of the tube to remove material whereby tapered fingers are left which form the expanses. With the fingers or expanses being formed from the side wall of the tube, they have the same composition as the remainder of the tube, and thus the pliancy and stiffness of the plastic which makes up the tube proper. Since the expanses or fingers are tapered, and unjoined from each other, they have a greater degree of pliancy than the tube proper, where bending is inhibited by the cylindrical configuration of the tube. When such a tip is advanced through a pipe, the fingers described yieldably guide the tip around corners and other obstructions. They also offer no impairment to withdrawal of the tube for the unthawing operation is completed.

The water which is circulated through the feed tube to unthaw the ice within the pipe is contained within reservoir 18.

A return hose system 20 has been described and this is present to provide a return to the reservoir of the water used to melt the ice and the water formed from the melted ice. Specifically, the hose system comprises a length of hose 32, a T member 34 and a length of hose 36. Hose 32 is joined in fluid-tight relation to pipe 10 which is being treated, and in this connection, it is convenient to have the hose with an I.D. approximating the O.D. of the pipe so that the hose can be inserted over the pipe with a snug fit producing a seal. With the O.D. of leg 34a in the T member being the same as that of the pipe, the opposite end of the hose may be joined to leg 34a in a similar manner. Hose 36, which also may have the size of hose 32, is joined to leg 34b in a similar manner.

The feed tube is advanced into the pipe by threading such through hose 36, the legs in the T member and hose 32, whence it enters the pipe and advances down the pipe as thawing of ice progresses. The hose 36 and hose 32 constitute a tube channeling length of hose means in the hose system. With all these elements having inner diameters substantially exceeding the outer diameter of the feed tube, no sealing relationship is established between this tube channeling hose means and the feed tube, and minimal resistance is offered to movement of the feed tube through this tube channeling hose means.

Leg 34c of the T member, which is referred to herein as a shunt length of hose means, provides a passage for the return of water to reservoir 18.

It should be noted that hose 36 is provided with a bend, and has its end opposite the end connected to the T member, i.e., end 38, opening to the atmosphere at an elevation disposed above the connection of the shunt length of hose means, i.e., leg 34c, with legs 34a, 34b. As a result, a static head of water is created within hose 36 which prevents water being returned by the return hose system from being ejected from end 38, all such water being returned to the reservoir by the shunt length of hose.

Pump 22, which may be suitably powered as by the electric motor at 22a, has its intake end connected by hose 40 to the interior of reservoir 18. The discharge end of the pump connects via hose 42 to the intake of heater 24 which is a water heater and preferably a quick recovery tape of heater, of either the gas or electric type. Water leaves the heater through outlet 44 which is connected to an end of feed tube 16. Extra length of the feed tube may be stored as in the coils shown at 46.

Explaining briefly how the apparatus described operates, when a pipe is discovered to have frozen while under the ground, the return conduit system is connected to an end of the pipe through connecting hose length 32 to a severed end of the frozen pipe. The feed tube is threaded through the interior of the tube channeling length of hose means in the return hose conduit system. The pump and heater are turned on and the heater adjusted preferably to have the water within the range of 60°–180° F., and optimally in the neighborhood of 120°–160° F.

Water ejected from the tip of the feed tube is ejected laterally and forwardly into the ice within the pipe. Such ice melts, and is loosened, and water and chunks of partially melted ice flow freely backwardly down through the interior of the pipe and over the outside of the tube to be carried back to the reservoir.

The fingers at the probing end of the feed tube guide the tube over obstructions and bends which are present in the pipe. Minimal resistance is offered to the advancement of the tube, which means that by manually forcing the same through the tube channeling length of hose means, in many instances as much as 150 to 200 feet of pipe may be unfrozen in this manner.

While an embodiment of the invention has been described, obviously variations and alterations are possible without departing from the invention.

It is claimed and desired to secure by letters patent:

1. Apparatus for thawing frozen water pipe comprising a stiff but pliant feed tube which is adapted to be inserted into and then thrust along the interior of the frozen pipe which tube terminates at a probing end,
    a tip forming the probing end of the tube which leads the tube on such being advanced along the interior of the pipe,
    said tip being formed by side expanses that converge on each other progressing toward the end of the tip and there being openings defined between side expanses accommodating the ejection of water through the tip laterally and in a forward direction while the tube is advanced within the pipe.

2. The apparatus of claim 1 wherein said side expanses are also formed of pliant material and said side expanses having greater pliancy than the pliancy of the tube.

3. The apparatus of claim 1, wherein the side expanses comprise fingers of tapered outline projecting forwardly to distal ends located at the forward end of the tip.

4. The apparatus of claim 1, wherein said side expanses comprise tapered fingers with proximal ends joined to the tube and unjoined distal ends, the fingers converging on each other progressing toward the end of the tip, the fingers being pliable and having greater pliancy than the pliancy of the tube.

5. The apparatus of claim 1 which further comprises a reservoir and a water return hose system which includes a tube channeling length of hose means and a shunt length of hose means, the latter being joined at one end to the tube channeling length of hose means between the ends of said tube channeling length of hose means and said shunt length of hose means having an open bottom end, one end of said tube channeling length of hose means being adapted to be sealed to the pipe being unfrozen and when so sealed forming an extension thereof, the feed tube extending loosely through said tube channeling length of hose means without sealing relation established between the feed tube and the interior of the length of hose means, the other end of said tube channeling length of hose means opening to the atmosphere at an elevation disposed above said one end of said shunt length of hose means, the open bottom end of said shunt length of hose means communicating with said reservoir.

6. Apparatus for thawing frozen pipes in operative position comprising:

a reservoir, a water return hose system including a tube channeling length of hose means and a shunt length of hose means with the latter joined at one end to the tube channeling length of hose means between the ends thereof and said shunt length of hose means having an open bottom end, one end of said tube channeling length of hose means being sealed to the pipe being unfrozen and forming an extension of said pipe, a stiff but pliant feed tube extending loosely through said tube channeling length of hose means without sealing relationship established between the feed tube and the interior of the hose means, said feed tube extending into the interior of the pipe to be unfrozen and terminating in a probing end, said probing end being formed by a tip which includes side expanses converging on each other progressing toward the end of the tip and there being openings defined between said side expanses accommodating the ejection of water through the tip, said shunt length of hose means having its open end communicating with said reservoir, the other end of said tube channeling length of hose means opening to the atmosphere at an elevation disposed above said one end of said shunt length of hose means.

7. The apparatus of claim 6, wherein said side expanses comprise fingers of tapered outline projecting forwardly to distal ends located at the forward end of the tip.

8. In apparatus for thawing frozen water pipe, a stiff but pliant feed tube which is adapted to be inserted into and then thrust along the interior of the frozen pipe which tube terminates at a probing end, a tip forming the probing end of the tube which leads the tube on being advanced along the interior of the pipe, said tip being formed by elongate tapered fingers integral with the side walls of the tube that converge on each other progressing toward the end of the tip and there being openings defined between adjacent fingers accommodating the ejection of water through the tip laterally and forwardly within the pipe when the tube is advanced therealong.

* * * * *